United States Patent Office 2,865,610
Patented Dec. 23, 1958

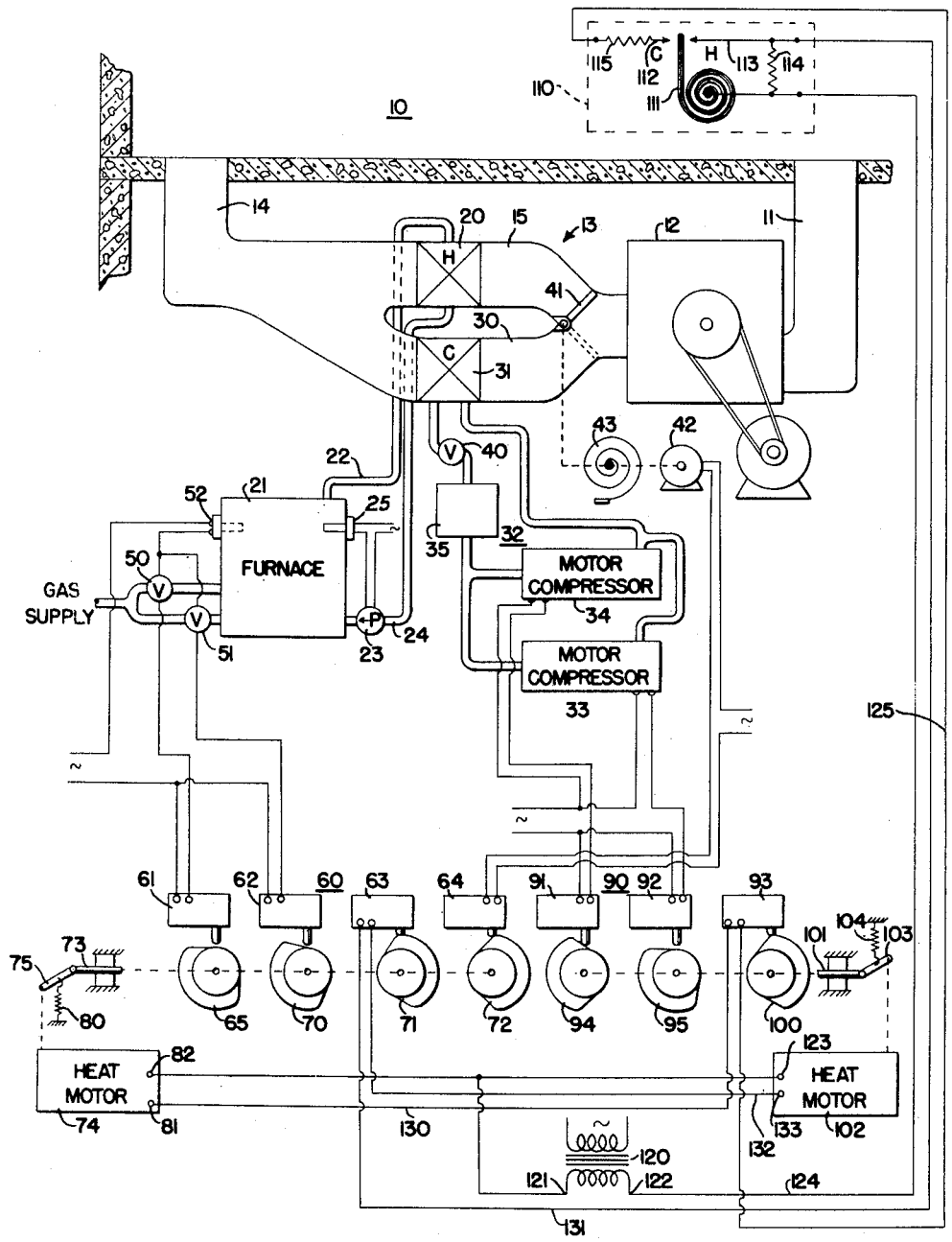

2,865,610

CONTROL APPARATUS

Hubert T. Sparrow, Minneapolis, Minn., assignor to Minneapolis-Honeywell Regulator Company, Minneapolis, Minn., a corporation of Delaware Application November 22, 1955, Serial No. 548,303

3 Claims. (Cl. 257—3)

The present invention is concerned with apparatus for controlling the operation of a bimetal heat motor driven step controller for switching various stages of heating apparatus and a bimetal heat motor driven step controller for switching various stages of cooling apparatus, the motors being controlled from a thermostat having time modulation. A switch on each step controller provides an interlock to prevent simultaneous operation of the step controllers.

As the present day heating and cooling installations, especially for residential use, are becoming more complicated and require more complex control circuits, there is a need for simple and reliable control apparatus for controlling multi stages of heating and cooling apparatus and for providing automatic change-over depending upon the need as sensed by a control thermostat.

Whenever heating and cooling apparatus is controlled from a common thermostat it is desired that an interlock be provided to prevent change-over from one to the other until the first has been de-energized. In the present invention a step controller is used for controlling the heating apparatus and a step controller is used for controlling the cooling apparatus, both of these step controllers are driven by a bimetal type heat motor giving position modulation to the step controller operation. An interlock circuit is provided to prevent simultaneous operation of the step controllers, that is, once one step controller has started through its operating range the other step controller cannot be energized. The bimetal type heat motor for use in the step controllers is controlled by a thermostat of the time modulation type, thus time modulation and position modulation are combined in controlling the heating or cooling apparatus.

It is therefore an object of the present invention to provide an improved control system for two sets of condition changing devices, there being a provision for preventing operation of one or the other whenever the first of the devices is in its operating range.

Another object of the present invention is to provide an improved heating and cooling control system having a first step controller for controlling the heating apparatus and a second step controller for controlling the cooling apparatus, these step controllers being driven by motors which are controlled by a space thermostat through an interlock circuit which provides for operation of only one of the step controllers at any time.

Still another object of the present invention is to provide an improved heating and cooling control system in which a step controller controls heating apparatus and a step controller controls cooling apparatus, each of the step controllers being driven by a position modulated motor controlled by a time modulation type thermostat, a control circuit for the step controller having an interlock to prevent simultaneous operation thereof.

These and other objects of the present invention will become apparent upon a study of the specification and drawing of which the single figure is a schematic diagram of the control apparatus.

Referring to the single figure a conditioned medium such as air is circulated to a space 10 through a duct system comprising return duct 11, a fan 12, a parallel duct system 13 connected to a supply duct 14 delivering the air to the space. Duct 13 includes a first duct 15 having a heating coil therein receiving water from a furnace 21 through supply means 22, the water being returned to the furnace by a conventional pump 23 through a return main 24. Pump 23 is controlled by a conventional controller 25 to only circulate water from the furnace when the furnace temperature is above some predetermined value. A second parallel duct has a cooling coil 31 therein which is connected to receive a suitable cooling means such as refrigerant from a refrigeration system 32 comprising two compressor units 33 and 34, respectively connected in parallel to pump the refrigerant into condensing coil 35 and through an expansion valve 40 to the cooling coil.

The direction of air flow as it exhausts from the constantly energized fan 12 is determined by the position of a damper 41 driven by a conventional motor 42 so that when de-energized the damper returns to one extremity of its operating range under the power of a spring 43. As shown, the damper motor 42 is energized and the damper 41 is in a position to block the passage of air through the heating coil and allow the air to pass through the cooling coil; however, upon de-energization of the motor the damper moves to a second position to block the cooling coil and allow air to pass through the heating coil.

Furnace 21 is of the gas burner type having two stages controlled by valves 50 and 51 each of which are energized through a circuit including a limit control 52 which shuts off the gas supply should the furnace temperature exceed some predetermined value. It should be understood that the apparatus heretofore described is of a conventional type and that while my invention is shown controlling such apparatus it is not to be restricted to this sort of heating and cooling apparatus alone but can be used with any sort of heating and cooling apparatus with only relatively minor changes in the connections usually accomplished by one skilled in the art.

A step controller 60 has a plurality of conventional switches 61, 62, 63, and 64 of the type disclosed in the McGall Patent No. 1,960,020. The switches are operated by a plurality of cams 65, 70, 71, and 72 connected to a common shaft 73 rotated by the output of a heat motor 74 connected to a crank arm 75 attached to the shaft. Crank 75 is biased in one direction by a spring 80 so that when the motor is deenergized the shaft as well as the associated cams will move to one extremity of their operating range. The heat motor is of a sort disclosed in the Bielski Patent 2,509,471. It has a pair of dissimilar metals connected to form a bimetal having a heater connected in heat transferring relation thereto so that when a source of power is connected to terminals 81 and 82 heat from the heater causes the bimetal to move thereby lever 75 is moved upward to rotate the step controller shaft 73 as well as the associated cams in a clockwise direction. Such a heat motor is very slow to operate in both the direction it rotates when the bimetal is being heated as well as the cooling direction as the mass of bimetal is usually large and its temperature changes quite slowly. Such a motor provides for positaion modulation of the step controller, the position of the shaft 73 depending upon the average time that the heater of motor 74 is energized, in other words the average time a source of power is connected to terminals 81 and 82.

A similar step controller 90 is used for controlling the cooling apparatus and has three switches 91, 92, and 93 operated by three associated cams 94, 95, and 100 connected to a shaft 101. The shaft is rotated by a second heating motor 102 having its output connected to lever 103 which is spring biased in a motor de-energized position by spring 104. Step controller 90 operates in a similar manner as 60, thus when motor 102 is energized shaft 101 slowly rotates clockwise to operate the switches in sequence. The rotation of shaft 101 is slow in both directions and position modulation is provided depending upon the average time that the heat motor is energized.

The motors of step controllers 60 and 90 are energized through a control circuit comprising a conventional space thermostat 110. The thermostat has a bimetal 111 engaging either one or the other of oppositely spaced contacts 112 and 113 depending on whether the bimetal experiences a temperature below a desired level or above the level. The thermostat has a time modulation control effect provided by the effect of a heater 114 connected between contact 113 and bimetal 111 which is shunted when the bimetal engages contact 113 and a heater 115 connected in the circuit with contact 112 to be energized when bimetal 111 engages contact 112. The use of such heaters to effect time modulation of the thermostat is obvious to one skilled in the art thus while this type of thermostat is disclosed it is recognized that other types of thermostats might be readily adapted to the present invention.

A source of power 120 having output terminals 121 and 122 has output terminal 121 connected to input terminal 82 of motor 74 and an input terminal 123 of motor 102. The second output terminal 122 is connected to bimetal 111 of the thermostat by conductor 124. The heating contact 112 of the thermostat is connected to motor 74 through a circuit comprising resistor 115, conductor 125, switch 93, conductor 130, and terminal 81. Motor 102 is connected to the cooling contact 113 of the thermostat through a circuit comprising contact 113, conductor 131, switch 63, conductor 132 and an input terminal 133 of motor 102.

The control circuit for motors 74 and 102 heretofore described provides an interlock feature. By means of switches 63 and 93 the operation of one or the other of the step controllers 60 or 90 is prevented when one is in its operating range. As switch 63 opens upon energization of step controller 60, step controller 90 cannot be energized. A similar condition exists when switch 93 of step controller 90 is open as step controller 60 cannot be energized. The interlock circuit provides for an automatic change-over between heating and cooling without the operation of either heating or cooling while the other is still energized, this being undesirable both from an economy standpoint and provides good control.

*Operation*

As shown in the figure thermostat 110 is satisfied as the space temperature is at the desired value. Step controllers 60 and 90 are in the de-energized position and both stages of heating and cooling are de-energized. The interlock switches 63 and 93 are closed so that either heat motor 74 or 102 can be energized depending upon which contact 112 or 113 bimetal 111 engages, this depending upon whether the space temperature increases or decreases from the desired value to indicate a need for cooling or heating, respectively.

Assume that the space temperature decreases and bimetal 111 moves to engage contact 112. Motor 74 is energized through the closed interlock switch 93 and lever 75 slowly moves upward to rotate shaft 73 clockwise. Initially cams 71 and 72 operate switches 63 and 64 respectively. Switch 63 opens to break the control of the cooling motor 102 thus operation of step controller 90 is prevented as long as step controller 60 is in its operating range and heating is being accomplished. Switch 64 opens to de-energize motor 42 and damper 41 moves to the position to block the cooling coil 31 and allow circulated air to pass through the heating coil 20. Soon thereafter depending upon the adjustment of the cam 70 switch 62 closes to energize valve 51 to supply the first stage of heating of furnace 21. Should the thermostat continue to cause energization of motor 74 the step controller continues to rotate clockwise until the second stage of heating that is valve 50 is energized. As heater 115 of the thermostat will provide for time modulation of the thermostat the circuit comprising bimetal 111 and contact 112 will open and close and the position of the step controller will modulate depending upon the average heat supplied to the heat motor.

Upon a satisfaction of the space temperature bimetal 111 will move away from contact 112 and motor 74 will slowly rotate the step controller cams in a counterclockwise direction to first de-energize valve 50 and then valve 51. Let us assume that the temperature of space 10 rises above the desired value, this is commonly known as "overshooting." Bimetal 111 would then engage contact 113 indicating a need for cooling. For good control thermostat 110 should be adjusted so that it would be quite sensitive and any little overshooting of the space temperature to bring about cooling immediately after the heating equipment was in operation. This would be undesirable especially from an economy standpoint therefore the interlock circuit is provided to prevent the operation of motor 102 should bimetal 111 engage contact 113 as long as step controller 60 is in its operating range. As mentioned previously switch 63 is opened to break the control circuit for motor 102. Since heat motor 74 is slow operating any overshooting of the space temperature would remain for only a short period thus by the time the step controller 60 had returned to its de-energized position to close switch 63, bimetal 111 will have moved away from contact 113.

A similar sequence takes place upon a need for cooling in space 10. Upon a rise in the space temperature bimetal 111 engages contact 113 and heat motor 102 is energized since interlock switch 63 is closed, step controller 60 being in the extreme position attained after de-energization. As step controller 90 is energized and shaft 101 rotates clockwise switch 93 opens the control circuit for step controller 60. At the same time the first stage of cooling is energized through switch 91. Upon a need for more cooling should the space temperature remain above the desired value the second stage of cooling controlled by switch 92 would be energized. At no time during the cooling operation can the heating step controller 60 be energized and even upon an "undershooting" of the temperature by excessive cooling to cause bimetal 111 to move against contact 112 the heating step controller is not energized. The interlock switch 93 remains open until the cooling step controller 90 returns to its extremity attained upon de-energization of motor 102. As the motor is slow to operate normally the abnormal decrease in the space temperature due to the overshooting condition disappears by the natural heat gain of the space from the outdoors before heat motor 102 has fully moved to its de-energized extremity, in this case being a fully counterclockwise position of the step controller 90.

It is therefore seen that a rather simple control circuit is obtained by the use of the step controllers 60 and 90 that are driven by the heat motors to control an elaborate heating and cooling installation. The arrangement provides for complete automatic change-over between heating and cooling however simultaneous operation of both heating and cooling is prevented by the interlock arrangement to prevent operation of one step controller should the other be in its operating range. There is a need for a control circuit for controlling heating and cooling apparatus of the type disclosed as well as other apparatus thus it is intended that while the invention is disclosed in a particular manner that it be only limited by the scope of the appended claims in which

I claim:
1. In a temperature control apparatus for controlling various stages of heating and cooling apparatus, a first step controller having a plurality of switches operated in a selected sequence, bimetal heat motor means, means connecting said motor in a driving relation to said step controller thereby providing position modulation for said step controller as it operates throughout its range, two of said plurality of switches adapted to control the operation of the heating apparatus, a third of said switches being normally closed when the step controller is in its initial position where said heating apparatus is deenergized, a second step controller having a plurality of switches operated in a selected sequence, a second bimetal heat motor, means connecting said second motor in a driving relation to said second step controller thereby providing position modulation for said step controller as it operates throughout its range, two of said last mentioned plurality of switches being adapted to control the operation of the cooling apparatus, a third of said last mentioned switches being normally closed when said step controller is in its initial position where said cooling apparatus is de-energized, temperature responsive means responsive to space temperature having first switch means normally closed when the space temperature is below a selected value and second switch means normally closed when the space temperature is above said selected value, a source of power, connection means including said first switch means and said third of the switches of the second step controller for connecting said first motor means to said source of power, and further connection means including said second switch means and said third of the switches of the first step controller for connecting said second motor to said source of power thereby an interlock is provided to prevent operation of one of said motors whenever the other has moved from its initial position upon the call for heating or cooling by said temperature responsive means.

2. In temperature control apparatus for controlling the operation of heating and cooling apparatus, first motor means having a bimetal operator whose position depends upon the total time of energization of a heater associated therewith, said motor means being adapted to control the heating apparatus, switch means associated with said motor and being normally closed whenever said motor means is at the extremity of its operation range attained upon its de-energization, second motor means having a bimetal operator whose position depends upon the total time of energization of a heater associated therewith, said motor means being adapted to control the cooling apparatus, second switch means associated with said second motor and being normally closed whenever said second motor means is at the extremity of its operation range attained upon its de-energization, temperature responsive switch means responsive to a space temperature comprising a first and second sections, a source of power, connection means for connecting said heater of the first motor means to said source of power through a series circuit comprising said second switch means and said first section thereby said motor means is controlled in response to said temperature responsive means and furthermore its operation is prevented upon the energization of said second motor means as said second switch means would open, second connection means for connecting said heater of the second motor means to said source of power through a series circuit comprising said first switch means and said second section thereby said motor means is controlled in response to said temperature responsive means and furthermore its operation is prevented upon the energization of said first motor means as said first switch means would open.

3. In temperature control apparatus for controlling heating and cooling apparatus, a first motor driven step controller having a plurality of switches operated in sequence, said step controller controlling various stages of heating through the operation of said switches, one of said switches being normally closed when said step controller is in the no heat or de-energized position, a second motor driven step controller having a plurality of switches operated in sequence, said step controller controlling various stages of cooling through the operation of said last mentioned switches, one of said switches being normally closed when said second step controller is in the no cooling or de-energized position, temperature responsive means responsive to space temperature, said temperature responsive means having a first switch for heating and a second switch for cooling connection means including said one switch of the second step controller for connecting said first switch of said temperature responsive means to said first motor driving step controller so that upon a call for heat should said one switch of the second step controller be closed said first step controller is energized to turn on stages of heating, and connection means including said one switch of the first step controller connecting said second switch of said temperature responsive means to said second motor driven step controller so that upon a call for cooling should said last mentioned switch be closed said second step controller is energized to turn on stages of cooling.

References Cited in the file of this patent

UNITED STATES PATENTS

| | | |
|---|---|---|
| 2,136,559 | Miller | Nov. 15, 1938 |
| 2,246,550 | Stewart et al. | June 24, 1941 |
| 2,701,128 | Gillick et al. | Feb. 1, 1955 |
| 2,730,336 | Shiers | Jan. 10, 1956 |